Jan. 13, 1948.    R. V. ANDERSON    2,434,481
SUBMERGED MELT WELDING
Filed Dec. 19, 1945
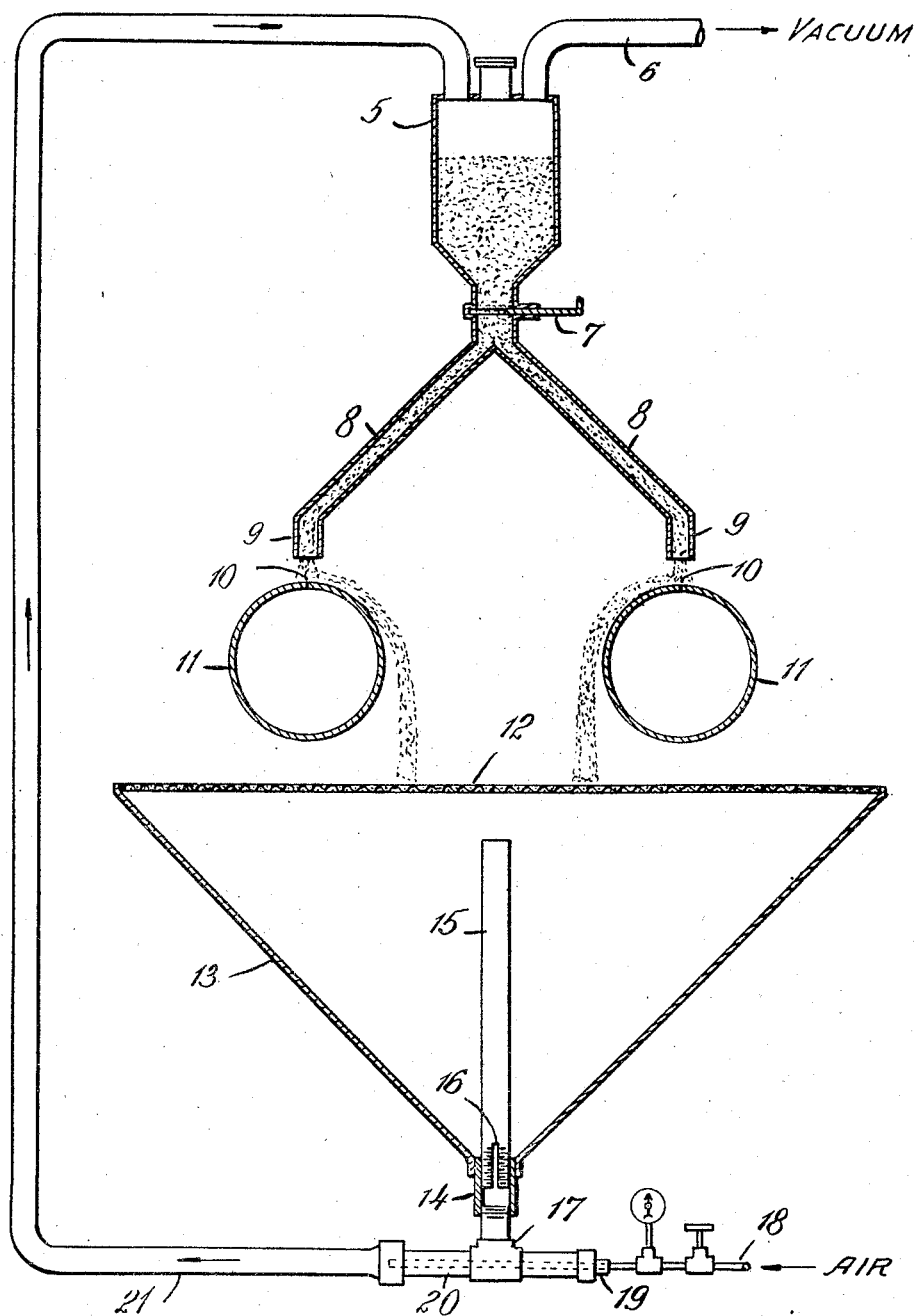
INVENTOR
REA V. ANDERSON
BY
ATTORNEYS Patented Jan. 13, 1948

2,434,481

UNITED STATES PATENT OFFICE 2,434,481

SUBMERGED MELT WELDING

Rea V. Anderson, Los Angeles, Calif., assignor to Rheem Manufacturing Company, Richmond, Calif.

Application December 19, 1945, Serial No. 635,874

8 Claims. (Cl. 219—8)

This invention relates to submerged melt welding and, more particularly, to a continuous recovery system for the flux used in such a welding operation.

Submerged melt welding is an operation in which fusion of the welding electrode takes place under a burden of flux. The flux is in the form of discrete granules ranging in size from 12 to 200 mesh. This granular flux is supplied to the welding zone in sufficient quantity to insure submersion of the welding electrode and the work in the welding zone. The welding temperature not only melts the welding rod or electrode but further melts a portion of the flux in the immediate vicinity of the weld. The flux, and particularly the molten flux, insures a sound weld essentially free of oxide inclusions. The oxides which do tend to form, and any impurities in the molten weld itself, combine with the flux to form a slag which, when solid, is in the form of an agglomerated or fused mass.

In order to assure adequate protection of the weld during its fabrication, a large excess of flux is provided. As the welding zone progresses along the work, there is left behind not only solid slag but also a large quantity of unused granular flux. Economy of operation requires recovery of the unused flux, and heretofore it has been the practice to recover the unused flux by various procedures which include some manual operation.

The present invention contemplates a novel recovery system for such unused welding flux whereby continuous welding may be carried out while continuously and automatically recovering the unused flux and returning it for reuse. The complete recovery system comprises apparatus for supplying flux continuously to a submerged melt welding zone and for continuously recovering and returning unused granular flux to the supply zone. The apparatus comprises storage means for the flux, delivery means for supplying the flux to the welding zone and means for separating unused flux from the slag produced in the welding zone. In the presently preferred embodiment of the invention, the separating means is a screening device adapted to collect the unused granular flux and the slag produced in the welding zone and further adapted to separate the unused flux from the slag. The separated unused flux is collected in a receiver and returned to a storage means by a fluid carrier, such as an air stream carrier, capable of carrying the flux in suspension. Means are further provided for releasing the unused flux from the receiver to the carrier at a rate not in excess of the capacity of the carrier to carry the flux in suspension. Thus, the invention contemplates a method of continuously supplying flux to a submerged melt welding zone which includes maintaining a storage supply of flux, delivering the flux to the welding zone, continuously separating unused flux from the slag produced in the welding zone and returning this unused flux to the storage supply.

The foregoing and other novel features of the invention will be more fully understood from the following description taken in conjunction with the accompanying drawing, in which the sole figure is a diagrammatic view, partly in section of the complete apparatus of the invention for supplying and recovering the flux in a submerged melt welding zone.

The granular flux for use in the welding zone is initially charged to a hopper 5 of a vacuum pick-up provided with a vacuum line 6. The flow of granular flux from the hopper to the welding zone is controlled by a suitable gate or valve 7 which admits the flux to a supply pipe 8 through which the flux is delivered to a storage hopper 9. The apparatus may include a single delivery pipe and storage hopper for supplying flux to a single welding zone, or it may include two (as shown) or more delivery pipes and respective storage hoppers for supplying flux to two or more welding zones in which welding may be carried out simultaneously. The granular free-flowing flux fills the delivery pipe 8 as well as the storage hopper 9.

The granular flux is discharged from the storage hopper 9 directly into the welding zone 10 and accumulates in the form of a mound under this zone. The welding zone illustrated in the drawing comprises the longitudinal seam of a cylindrical metal container 11, two of these containers being welded simultaneously. It should be understood that the specific welding zone forms no part of the invention and that the invention is applicable to the welding of any weldable metal parts. As the weld progresses along the work, there is left behind both unused flux and the slag produced during the welding operation. The unused flux and slag from a finished welding zone are caused to flow away from the work by any appropriate means. Thus, the amount of vibration imparted to the work in the shop may be sufficient to cause the flux and slag to flow away. Alternatively, the unused flux and slag may be deliberately moved away by agitating the work or by moving the flux and slag with a compressed air blast, a brush, scraper or other deflecting means.

The unused flux and the slag flowing away from the welding zone fall onto a screen 12. The mesh of the screen is sufficiently coarse to permit passage of granular flux therethrough while at the same time retaining agglomerated or fused masses of slag. The flux and slag tend to form a pile on the screen but the falling particles of flux and slag impinging on the screen impart sufficient agitation to the pile to effect the desired separation by screening action. The mass of slag retained on the screen may be removed periodically whenever necessary.

The unused flux passing through the screen 12 is collected in a receiver 13 located directly below the screen. The receiver is advantageously of conical shape adapted to discharge the accumulated unused flux from its apex at the bottom. The flux alternately packs on the side walls of the receiver and then breaks up suddenly to fall into the apex of the receiver. A coupling 14 projects through the apex of the receiver. The upper end of this coupling within the receiver has a threaded pipe 15 screwed into it. The pipe is open at each end and is provided with one or more slots 16 formed in its lower threaded end. By screwing the pipe further into the coupling 14 or by unscrewing it, the size of the opening formed by the slot and the top of coupling 14 may be varied to adjust the amount of flux which can be discharged through the slot. The lower end of coupling 14 communicates with a T-joint 17. A compressed air line 18, provided with appropriate control valve and pressure gauge, extends through a packing 19 in the end of one arm of the T-joint and at least part way toward the end of the other arm of the joint. This air supply line extending through the T-joint provides a jet action which draws air downwardly through the pipe 15 inside the receiver. As the granular unused flux falls into the apex of the conical receiver and through the slot 16, it is picked up by air sucked through the pipe 15 and is carried through the open end 20 of the T-joint. The suspended particles of flux flowing from this end of the T-joint are conducted through a return line 21 to the upper portion of the vacuum pick-up hopper 5. The flux filling the delivery pipe 8 and the storage hopper 9 acts as a seal for the bottom part of the pick-up hopper 5 so that the air used to carry the flux in suspension is removed from the hopper 5 through the vacuum line 6.

It will be seen that the apparatus of the invention provides means for continuously supplying flux to a submerged melt welding zone and means for continuously separating unused flux from slag produced in the welding zone with continuous return of the unused slag without any manual operation. The receiver and air carrier of the apparatus provide a means of handling a larger weight and volume of recovered flux than is possible by a vacuum pick-up. In the apparatus of the invention, the slot 16 restricts the release of flux from the receiver to the air carrier at a rate which is never in excess of the capacity of the air carrier to carry this flux in suspension. The apparatus is thus so designed that the granular flux will not clog the return line to the storage hopper. Moreover, the stream of compressed air does the major amount of work in carrying the recovered unused flux to the storage hopper. The vacuum side of the vacuum pick-up serves principally as a means of dustlessly separating the recovered flux from the carrier air. A cyclone-type separator may be used in lieu of the vacuum pick-up hopper and vacuum line provided adequate precautions are taken to avoid discharging fine dust into the shop atmosphere.

I claim:

1. Apparatus for supplying flux to a submerged melt welding zone which comprises storage means for granular flux, delivery means for supplying said flux to the welding zone, separating means adapted to collect unused granular flux and slag produced in the welding zone and to separate said unused flux from the slag, and means for returning said unused flux to the storage means.

2. Apparatus for supplying flux to a submerged melt welding zone which comprises storage means for granular flux, delivery means for supplying said flux to the welding zone, separating means adapted to collect unused granular flux and slag produced in the welding zone and to separate said unused flux from the slag, receiving means adapted to receive unused flux separated from the slag, and means for returning said flux from the receiving means to the storage means.

3. Apparatus for supplying flux to a submerged melt welding zone which comprises storage means for granular flux, delivery means for supplying said flux to the welding zone, separating means adapted to collect unused granular flux and slag produced in the welding zone and to separate said unused flux from the slag, receiving means adapted to receive unused flux separated from the slag, fluid carrier means adapted to return said flux suspended in the fluid to the storage means, and means adapted to release unused flux from the receiver means to the fluid carrier means at a rate not in excess of the capacity of the fluid carrier means to carry said flux in suspension.

4. Apparatus for supplying flux to a submerged melt welding zone which comprises storage means for granular flux, delivery means for supplying said flux to the welding zone, separating means adapted to collect unused granular flux and slag produced in the welding zone and to separate said unused flux from the slag, receiving means adapted to receive unused flux separated from the slag, air carrier means adapted to return said flux suspended in the air to the storage means, and means adapted to release unused flux from the receiver means to the air carrier means at a rate not in excess of the capacity of the air carrier means to carry said flux in suspension.

5. Apparatus for supplying flux to a submerged melt welding zone which comprises storage means for granular flux, delivery means for supplying said flux to the welding zone, separating means adapted to collect unused granular flux and slag produced in the welding zone and to separate said unused flux from the slag, receiving means adapted to receive unused flux separated from the slag, air carrier means adapted to return said flux suspended in the air to the storage means, means adapted to release unused flux from the receiver means to the air carrier means at a rate not in excess of the capacity of the air carrier means to carry said flux in suspension, and means for separating the carrier air from the flux returned to the storage means.

6. Apparatus for supplying flux to a submerged melt welding zone which comprises storage means for granular flux, delivery means for supplying said flux to the welding zone, separating means adapted to collect unused granular flux and slag produced in the welding zone and to separate said unused flux from the slag, receiving means adapted to receive unused flux separated from the slag, air carrier means adapted to return said flux suspended in the air to the storage means, and discharge means adapted to release unused flux from the receiver to the air carrier means, said discharge means having an opening of restricted size communicating with said flux in the receiver means adapted to release said flux at a rate not in excess of the capacity of the air carrier means to carry the flux in suspension.

7. Apparatus for supplying flux to a submerged melt welding zone which comprises storage means for granular flux, delivery means for supplying said flux to the welding zone, separating means adapted to collect unused granular flux and slag produced in the welding zone and to separate said unused flux from the slag, receiving means adapted to receive unused flux separated from the slag, a return line for returning unused flux from the receiver to the storage means, and an air jet disposed in the return line adapted to provide a stream of air capable of carrying said unused flux in suspension and capable of drawing from the receiver means into the return line the unused flux to be returned to the storage means.

8. Apparatus for supplying flux to a submerged melt welding zone which comprises storage means for granular flux, delivery means for supplying said flux to the welding zone, separating means adapted to collect unused granular flux and slag produced in the welding zone and to separate said unused flux from the slag, receiving means adapted to receive unused flux separated from the slag, a return line for returning unused flux from the receiver to the storage means, an air jet disposed in the return line adapted to provide a stream of air capable of carrying said unused flux in suspension and capable of drawing from the receiver means into the return line the unused flux to be returned to the storage means, and means adapted to release said flux from the receiver into the return line at a rate not in excess of the capacity of the air stream to hold the flux in suspension.

REA V. ANDERSON.

REFERENCES CITED

The following references are of record in the file of this patent:

UNITED STATES PATENTS

| Number | Name | Date |
|---|---|---|
| 2,105,079 | Halslag | Jan. 11, 1938 |
| 2,189,399 | Lewhers | Feb. 6, 1940 |
| 2,390,560 | Stanley et al. | Dec. 11, 1945 |